(No Model.) 2 Sheets—Sheet 1.
J. GREEN.
CAR COUPLING.
No. 448,613. Patented Mar. 17, 1891.
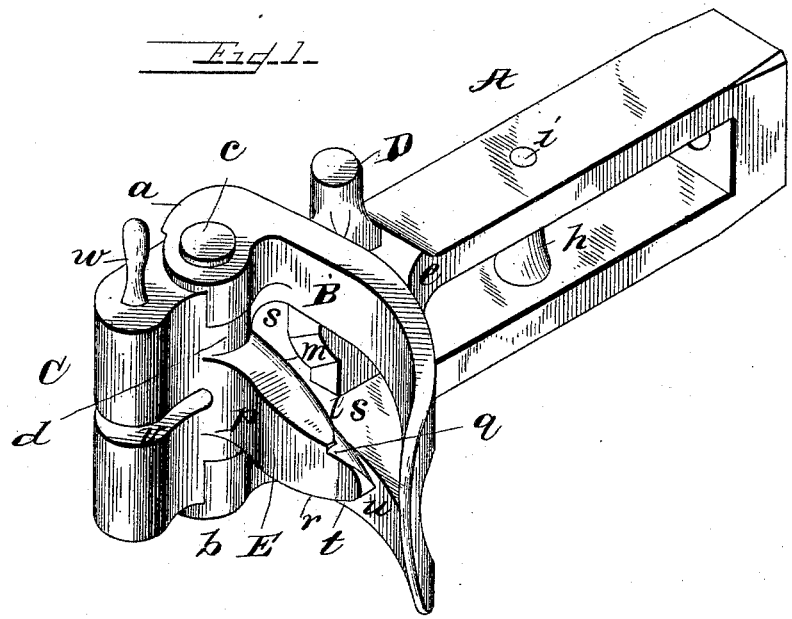
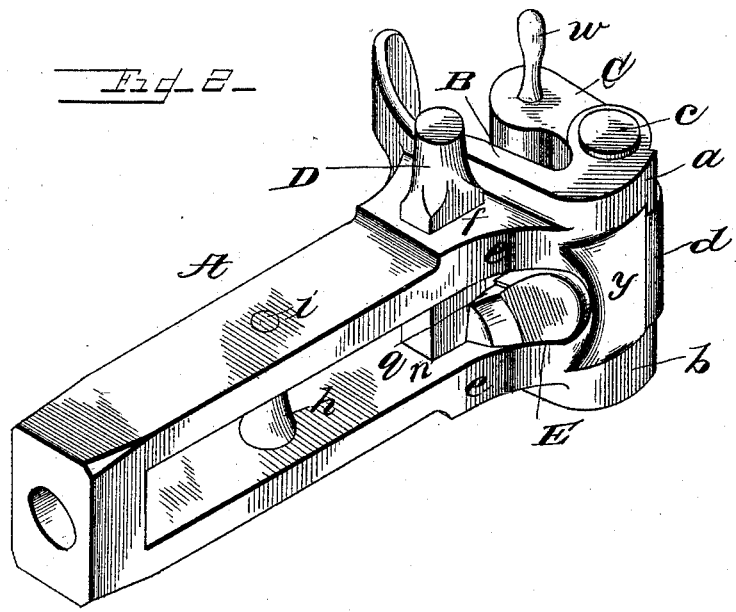
Witnesses  
G. A. Tauberschmidt  
J. D. Kingsbury
Inventor  
John Green  
By his Attorneys  
Johnston, Reinohl & Dye (No Model.) 2 Sheets—Sheet 2.
J. GREEN.
CAR COUPLING.
No. 448,613. Patented Mar. 17, 1891.
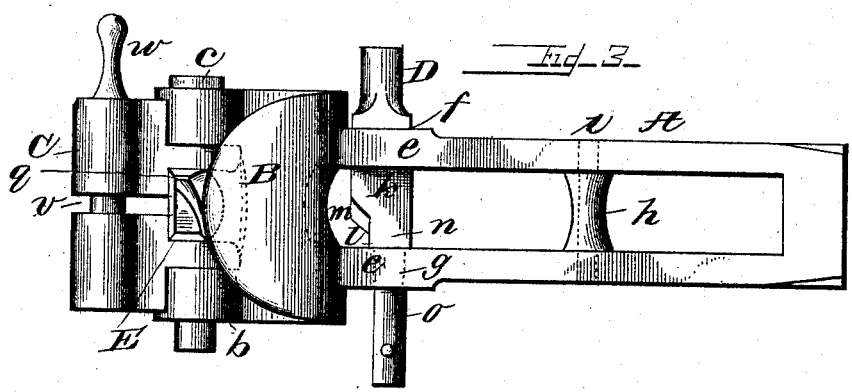
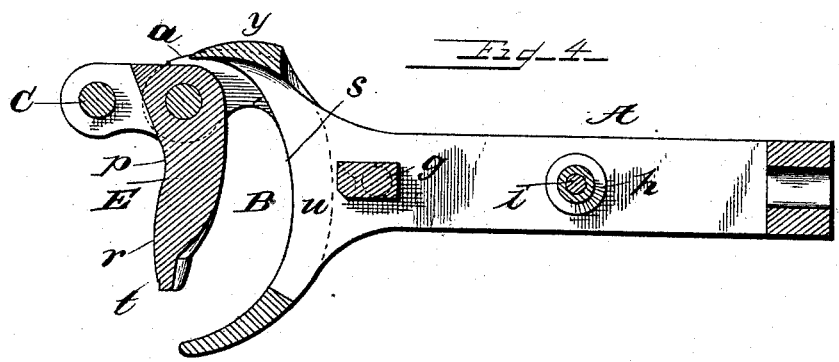
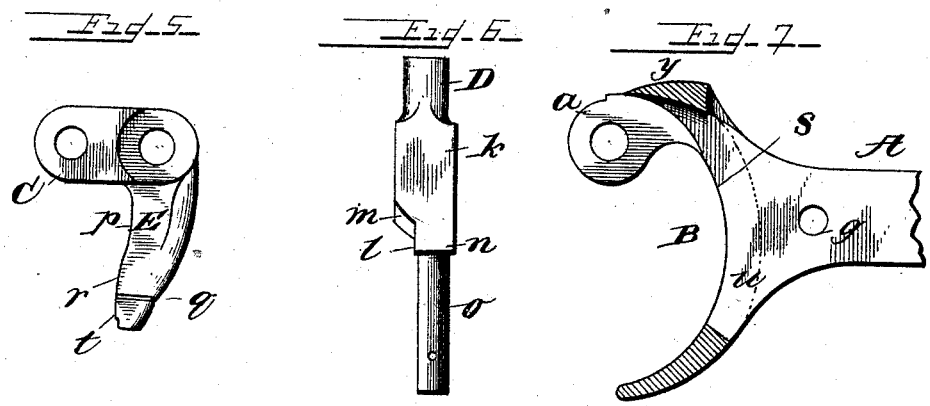
Witnesses
G. A. Tauberschmidt
J. D. Kingsbury
Inventor
John Green
By his Attorneys
Johnston, Reinohl & Dyre

UNITED STATES PATENT OFFICE.

JOHN GREEN, OF RENOVO, PENNSYLVANIA, ASSIGNOR OF ONE-HALF TO WILLIAM L. HOLMAN AND JOHN McCORD, BOTH OF SAME PLACE.

CAR-COUPLING.

SPECIFICATION forming part of Letters Patent No. 448,613, dated March 17, 1891.

Application filed December 8, 1890. Serial No. 373,954. (No model.)

*To all whom it may concern:*

Be it known that I, JOHN GREEN, a citizen of the United States, residing at Renovo, in the county of Clinton and State of Pennsylvania, have invented certain new and useful Improvements in Automatic Car-Couplings; and I do hereby declare the following to be a full, clear, and exact description of the invention, such as will enable others skilled in the art to which it appertains to make and use the same.

My invention relates to car-couplings, and has especial reference to that class of couplings known among railroad employés as the "Janney type," and has for its object certain improvements in construction, which will be hereinafter described, and more distinctly pointed out in the claims.

In the accompanying drawings, which form part of this specification, Figure 1 represents a perspective view of my improved coupling, showing the hook in position for coupling; Fig. 2, a similar view taken from the rear side and showing the hook closed; Fig. 3, a vertical longitudinal section; Fig. 4, a horizontal section; Fig. 5, a top plan of the hook detached; Fig. 6, a side elevation of the trip-pin or dog for locking the hook, and Fig. 7 a top plan of the front end of the draw-bar with the coupling-hook removed.

Reference being had to the drawings and the letters thereon, A indicates the draw-bar, which has forged integral therewith the head B, which is provided with lugs or ears $a$ $b$, to which the coupling-hook C is pivotally secured by a bolt or pin $c$ passing through the lugs and portion $d$ of the hook and forming a knuckle-joint. Through the re-enforced portions $e$ $e$ of the body of the draw-bar are formed an angular slot $f$ in the upper side and a round hole $g$ in the lower side for the reception of corresponding portions of the pin D, and to prevent the sides of the draw-bar being pressed in a spool or stud $h$ is secured between them by a rod $i$, which passes through the sides and the spool and is upset or riveted on one of its ends.

The trip-pin D is of sufficient length to project upon both sides of the draw-bar, and is provided with a rectangular portion $k$, having a notch $l$, a rounded and inclined surface or shoulder $m$, with which the tongue of the hook C engages, a square portion $n$, upon which the weight of the pin is sustained, and a cylindrical portion $o$, which engages the hole $g$ in the lower side of the draw-bar.

The tongue E of the hook is provided with a plain flat face $p$, and the top and rear of the tongue are rounded to prevent dirt resting upon it, and the front end is notched at $q$ and inclined to correspond and engage with the shoulder $m$ on the pin D. The lower surface $r$ of the tongue E is flat, for the purpose of cutting or pushing any ice, snow, or dirt out of the head through the opening $s$ on the rear side of the head, as shown in Figs. 1, 2, and 3, and the lower surface provided with an incline $t$ to prevent the end of the tongue catching on the surface $u$ of the draw-head as the knuckle-joint and the tongue wear by use.

In the ordinary construction of this class of couplings the rear side of the head is closed, and dirt falling from the car lodges in the cavity in the head, or ice and snow accumulate in the cavity and upon the tongue, which, when the tongue is moved back into the head, impacts it and frequently requires removing. By the construction shown the jar of coupling breaks the ice formed upon the tongue, and by virtue of its rounded surface readily falls back into the cavity in the head and is pushed out through the opening $s$ by the tongue as it moves back into the head in the act of coupling.

The hook D is provided with a slot $v$ and a pin $w$ for engaging with an ordinary link. Any ice which may accumulate upon the pin and on the inner surface of the lower side of the head around the hole $g$ is dislodged and cut away by the descent of the trip-pin.

On the rear side of the head and connecting the upper and lower parts is a swell or bulge $y$, the inner surface of which forms a seat or stop for the tongue E and takes the shock and sustains the pressure when shunting cars about a yard or depot in an uncoupled condition.

The draw-bar and its head are forged from a fagot in one continuous or homogeneous mass of iron, having sufficient metal in the outer end to be upset and drawn out in suitable dies to form a flange, out of which the head is formed and shaped in other dies, and thus produces a draw-bar in which there is a continuous fiber of metal and is strong, serviceable, and durable.

In another application filed herewith, Serial No. 373,953, I have claimed the method and means involved in the construction of the draw-bar. The hook may be drop-forged or forged in sections, or it may be cast in a mold.

Having thus fully described my invention, what I claim is—

1. A draw-bar having an opening in the rear side of its head, in combination with a swinging hook having a tongue constructed to automatically remove foreign matter from the interior of the head through said opening in the rear side thereof in the act of coupling.

2. A draw-bar having an opening in the rear side of the head and a rectangular slot in the upper side of the bar, an aperture in the lower side, and a trip-pin having a rectangular upper portion and a projection around said pin to cut ice and form a supporting-seat for the pin on the lower side of the draw-bar, in combination with a swinging hook constructed to push ice out of the draw-head automatically in the act of coupling.

3. A draw-bar having an opening in the rear side of its head and provided with a transverse swell or projection on said rear side between the upper and lower bars, in combination with a swinging hook having a tongue constructed to rest upon the inner surface of said swell and extending beyond the same to remove foreign matter from the interior of the head through the opening therein.

4. A draw-bar having an opening in the rear side of its head, in combination with a swinging hook having a tongue provided with a plain working or contact surface, a rounded top and rear surface, and a flat cutting-bottom, the whole constructed to remove foreign matter from the interior of the head automatically in the act of coupling.

5. A draw-bar having an opening in the rear side of the head, in combination with a swinging hook having a tongue provided with a plain working or contact surface, a rounded top and rear surface, and a bottom surface inclined upward at its end, for the purpose set forth.

In testimony whereof I affix my signature in presence of two witnesses.

JOHN GREEN.

Witnesses:
D. C. REINOHL,
WM. E. DYRE.